United States Patent
Bonner, Jr.

[15] 3,696,181
[45] Oct. 3, 1972

[54] FLASH EXTURSION OF POLYVINYL CHLORIDE

[72] Inventor: Willard Hallam Bonner, Jr., Wilmington, Del.

[73] Assignee: E. I. du Pont de Nemours and Company, Wilmington, Del.

[22] Filed: March 20, 1970

[21] Appl. No.: 21,454

Related U.S. Application Data

[63] Continuation-in-part of Ser. No. 699,875, Sept. 22, 1967, Pat. No. 3,503,907.

[52] U.S. Cl...............264/53, 260/2.5 P, 260/2.5 E, 264/51, 264/176, 264/205
[51] Int. Cl..............................................B29d 27/00
[58] Field of Search............260/2.5 E, 2.5 P; 264/53

[56] References Cited

UNITED STATES PATENTS

| | | | |
|---|---|---|---|
| 3,542,715 | 11/1970 | White | 260/2.5 E |
| 3,461,193 | 8/1969 | Gilardi | 260/2.5 EX |
| 3,227,664 | 1/1966 | Blades | 264/53 |
| 3,227,784 | 1/1966 | Blades | 264/53 |
| 3,389,446 | 6/1968 | Parrish | 28/76 |
| 3,381,077 | 4/1968 | Bonner | 229/21 |

FOREIGN PATENTS OR APPLICATIONS

| | | |
|---|---|---|
| 652,701 | 0/0000 | Belgium |
| 4,909 | 0/1964 | South Africa |

Primary Examiner—Julius Frome
Assistant Examiner—Paul A. Leipold
Attorney—John E. Dull

[57] ABSTRACT

A flexible, low density foam of polyvinyl chloride having closed polyhedral-shaped cells and very thin cell walls of uniform thickness is produced by flash extruding a solution of the polymer in a methylene chloride solvent under conditions such that the temperature of the product immediately after extrusion is above the boiling point of the solvent, but below the stability temperature of the foam. The resultant foam material is useful as a cushioning material.

2 Claims, 3 Drawing Figures

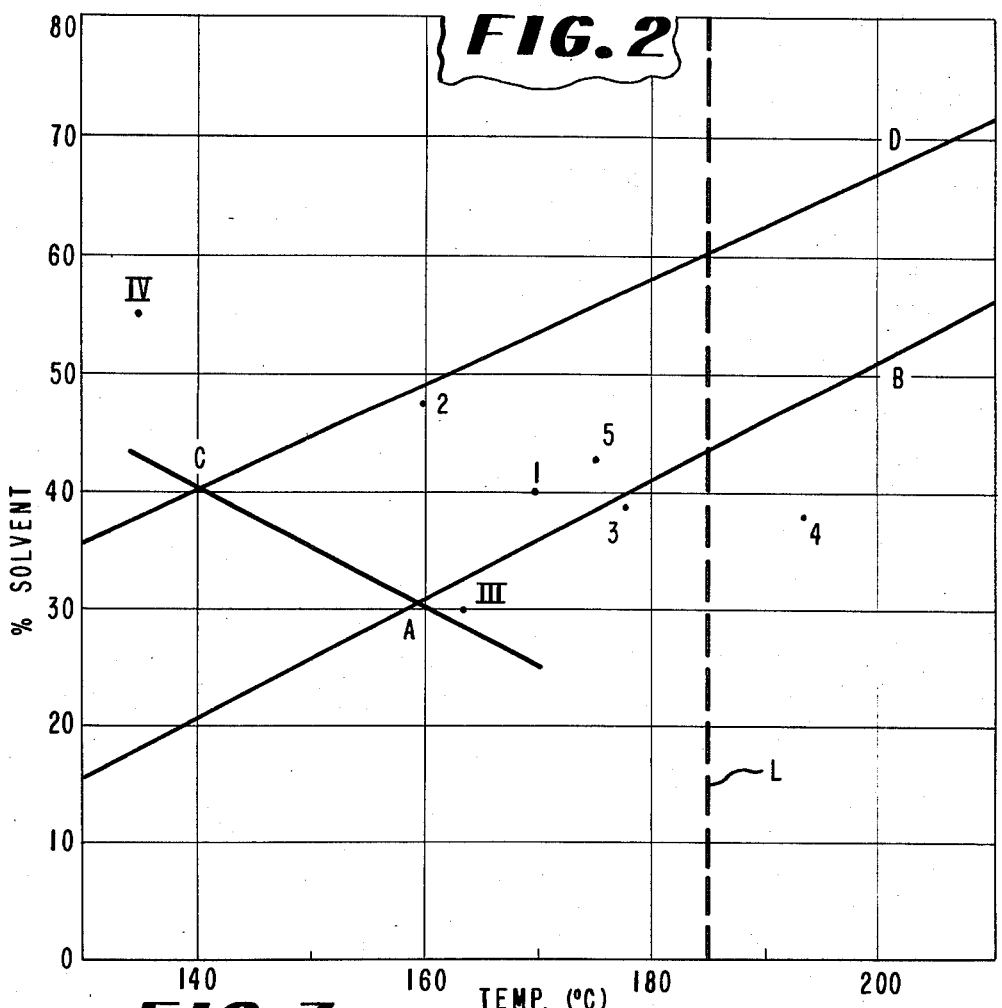
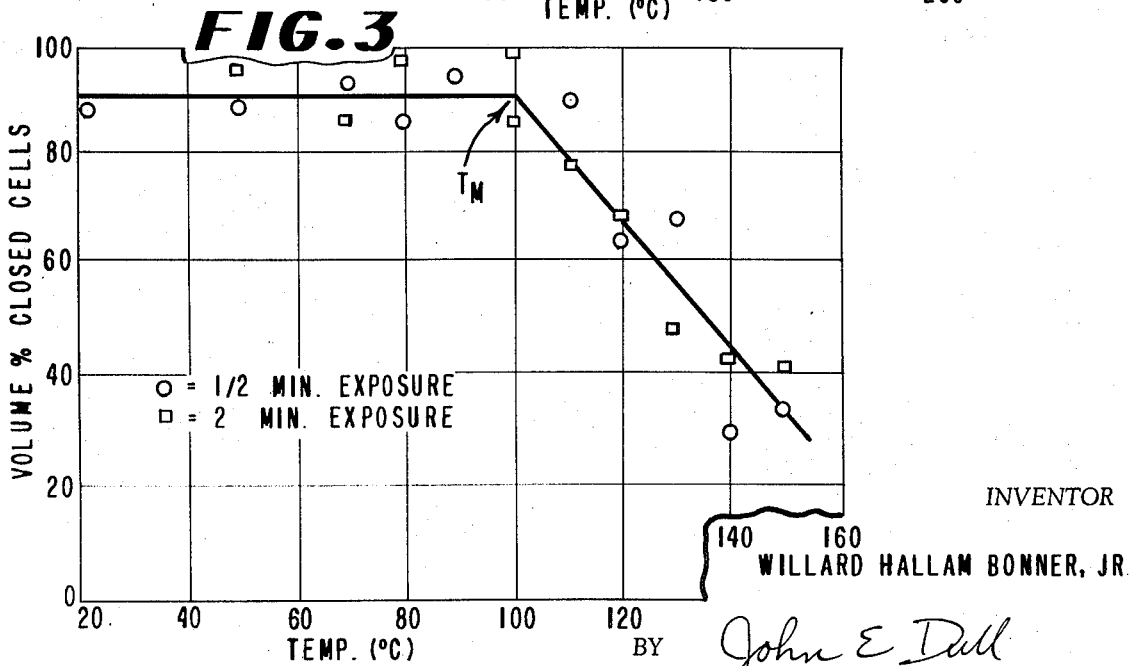

FLASH EXTURSION OF POLYVINYL CHLORIDE

CROSS REFERENCE TO RELATED APPLICATION

This application is a continuation-in-part of my copending application Ser. No. 699,875 filed Sept. 22, 1967 now U.S. Pat. No. 3,503,907.

BACKGROUND OF THE INVENTION

1. Field of the Invention

This invention is concerned with a process for making closed-cell foams of polyvinyl chloride (PVC) or polystyrene (PS). More particularly, it concerns a flash-extrusion process for making PVC or PS foams which are flexible and which may be gas-inflated to provide shock absorbing, cushioning structures.

2. Discussion of the Prior Art

Few segments of the active field of thermoplastic polymer cellular materials have received as much attention as PVC or PS cellular structures. This is a natural consequence of a combination of many favorable features; these polymers are relatively cheap and widely available, they have been known for a relatively long time, they possess many desirable properties (e.g., the non-flammability of PVC) and they may be processed into cellular materials by a variety of versatile routes. One class of "open-celled" products is prepared by sintering the contacting surfaces of adjacent particles of granular polymer. Another type of process extrudes or molds a blend of polymer with a second incompatible component which may subsequently be leached out of the solidified product, leaving behind cavities in a polymer matrix. Both the sintered and the leached products have relatively high densities (volume fraction of polymer normally above 50%) and irregular shaped "open-celled" voids. Another popular prior art technique starts with a plastisol of polymer particles which is converted into a foam/froth by mechanically whipping air into the plastisol, by vaporization of a volatile liquid component of the plastisol, by formation of gaseous products on decomposition of a thermally unstable component (blowing agent), etc., whereupon the foam must be quickly stabilized by heating in order to convert the plastisol froth into a gel foam. Still another class of polymer foam forming techniques first molds a shaped miniature from polymer containing a gas dissolved under high pressure (the gas may be provided from a variety of sources, as in the plastisol process). The mold is cooled before the pressure is released so that the gas remains metastably dispersed throughout the still unfoamed polymer. When the object is subsequently heated above the softening point of the polymer, the internally trapped gas expands the miniature into a full sized foam replica. Although both the plastisol and high pressure molding techniques can frequently be adjusted to produce either open- or closed-cell products, depending on the details of the particular system employed, the products of PVC normally have densities of 2 lbs./ft.$^3$ and higher; PS products have densities about 1 lb./ft.$^3$ and higher. As the density of the cellular product increases, the normal stiffness of the polymer leads to a brittle or rigid foam, although semi-rigid or flexible modifications are sometimes achievable by adding quantities of plasticizer (e.g. dioctylphthalate to PVC) to the formulations or by resorting to certain copolymers or blends of PVC or PS with elastomeric (co)polymers.

The prior art discloses a few attempts to extrude directly a molten PVC containing a gas or volatile liquid under pressure, whereupon a cellular structure is generated immediately beyond the extrusion orifice when the extrudate enters the atmospheric pressure region. These techniques have apparently not been popular for PVC possibly because of lack of stability of the nascent hot foam, a marked tendency for PVC to degrade at temperatures high enough to melt-process the polymer, and the requirement for high pressure extrusion equipment. PS, on the other hand, being stable at temperatures up to about 275° C., is frequently extruded as a melt containing a gas or a volatile liquid. The PS foams produced in this manner are generally quite brittle.

SUMMARY OF THE INVENTION

The present invention provides a flexible closed-cell PVC or PS product whose individual polyhedral-shaped cells are defined by thin, uniform polymeric walls. The invention also provides a flash-extrusion process for preparing such foam products.

The products of this invention have especial utility as cushioning materials. By virtue of their closed-cell character these PVC and PS products may be gas-inflated. Furthermore, the individual cell walls are so extremely thin that they are flexible in spite of the brittle, stiff character of the bulk polymer. This wall flexibility carries over to produce a resilient, pneumatic foam (even without adding large quantities of plasticizer to the polymer). The load bearing ability of the present products in gas-inflated form is in fact provided almost entirely by the confined gas, with only minor contribution from the thin polymeric cell walls. Moreover, the cell walls in the PVC foams provide extraordinarily good gas retention properties and hence excellent retention of pneumaticity. The PS foams are extraordinarily flexible, a characteristic not achieved by prior art PS foams. The fact that little or no plasticizer need be present to confer the desired degree of flexibility leads to a double advantage: first the gas impermeability of PVC decreases with increasing plasticizer concentration (or when copolymers or polymer blends are used), and second the present products do not suffer the time-dependent change in properties experienced with prior art foams made flexible by plasticizers as the latter gradually exude from the structure. Additionally, of course, the extremely thin walls of the present products lead to inflated products of low densities, e.g. about 0.015 g./cc. and below, with consequent low raw materials cost. The combination of all these features, together with others to be described below, ideally suits the present products for cushioning applications, e.g. protective packaging, automobile interior padding, as well as for thermal insulation, buoyancy devices, etc. It is also possible to prepare excellent "molded" cushioning structures of diverse shapes by self-adhering pre-expanded PVC or PS foam particles of the present invention under elevated temperature and pressure, as illustrated in Example I.

The process of the present invention comprises:

A. forming a solution of PVC or PS in a solvent whose boiling point is below about 100° C.

1. at a temperature above the boiling point of the solvent and a pressure at least equal to autogenous pressure, 2. at a concentration such that a. under autogenous pressure the solution is single phase and is flowable, and
b. the heat absorbed upon adiabatic vaporization of all the solvent present will reduce the temperature of the product (PVC or PS foam plus solvent vapor) to a value between the stability temperature $T_M$ of the foam (approximately 100° C.) and the boiling point of the solvent; and B. extruding the solution abruptly through an orifice into a region at lower pressure whereupon flash vaporization of substantially all the super-heated solvent occurs to produce a flexible closed-cell PVC or PS foam product retaining substantially no residual liquid solvent.

BRIEF DESCRIPTION OF THE DRAWINGS

FIG. 2 represents a "spinning diagram" defining the operable limits for the process of this invention for the specific system methylene chloride/PVC.

FIG. 3 is a plot of the per cent closed-cell character for portions of a given product of this invention after test exposures to various elevated temperatures, and indicates the method of determining the stability temperature $T_M$ for the specific PVC formulation employed in preparing this particular product.

DESCRIPTION OF THE PREFERRED EMBODIMENTS

Process Description

Figure 1:
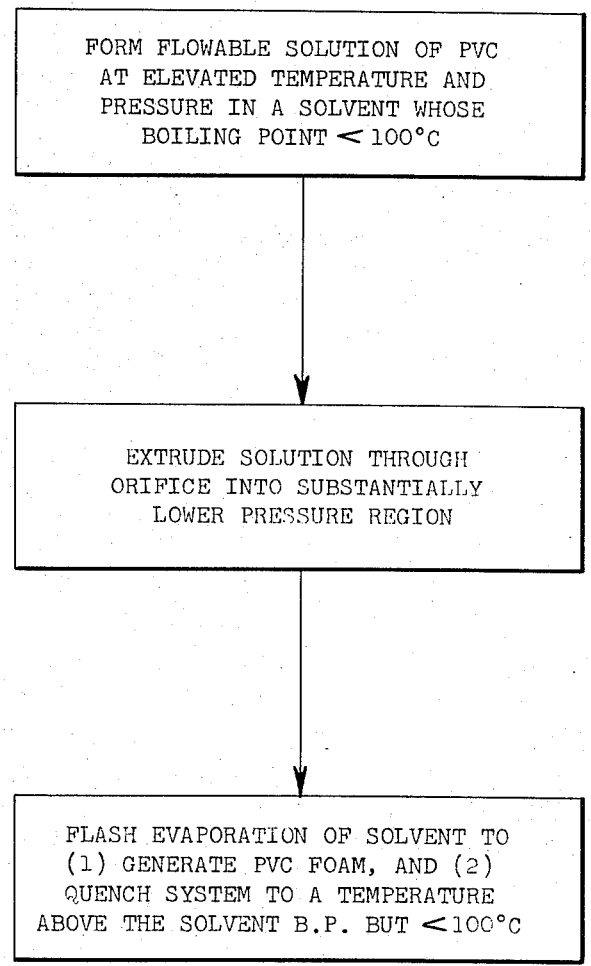
FIG. 1 is a self-explanatory flow chart representing the process of this invention.

Certain prior art employs molten PVC or PS containing a gas or superheated liquid dissolved under pressure, such that on extrusion through an orifice into a lower pressure region, expansion of the vapor generates a cellular product. However, the closed-cell products of this invention having thin walls, preferably of super-packed molecules, may be prepared only by flash extruding those solutions represented by points within the concentration-temperature region bounded by the Figure DCAB on a spin diagram such as given in FIG. 2. An analogous such spinning diagram may be constructed for other selections of solvent by the following steps:

1. The boundary line AB is the locus of all points (T, $w_s$) for which the heat of vaporization plus heat of expan ion of the indicated quantity of solvent is just equal to the energy released on cooling the system from the indicated initial temperature to a final temperature of $T_M$, i.e., all positive solutions to the equation:

$w_s [(\Delta H_v)_T + (\Delta H_{exp})_T] = (T-T_M)w_p C_p + (T-T_M)w_s C_s$
$= (T-T_M) [w_s(C_s - C_p) + C_p]$ where $w_s$ and $w_p$ are the initial weight fractions of solvent and polymer, T is the initial temperature, $T_M$ is the final temperature (approximately 100° C., see below)

$(\Delta H_v)_T$ is the heat of vaporization of the solvent from the solution at temperature T, $(\Delta H_{exp})_T$ is the heat absorbed on expansion of the solvent vapor from $p_T$ (the vapor pressure of the solvent above the solution at temperature T) to $p_F$ (the final pressure, e.g. atmospheric pressure), $C_p$ is the heat capacity of the polymer between T and $T_M$, and $C_s$ is the heat capacity of the solvent vapor between T and $T_M$.

In other words, flash (adiabatic) vaporization of any solution represented by a point on Line AB will lead to a final state of [polymer foam plus solvent vapor] at a temperature of $T_M$. As a good approximation (i.e., to within a few degrees) $T_M$ may be taken to be 100° C. The particular value of $T_M$ for any specific polymer formulation may be estimated experimentally as described below.

2. The boundary Line CD may be calculated in a manner completely analogous to boundary Line AB, except that the final temperature, instead of $T_M$, is set equal to the boiling point of the solvent.

3. The boundary Line AC represents a limiting set of polymer concentrations above which (e.g., in the "downward" direction on Figure 2) flowable solutions are not formed. "Flowable" means that the solutions, under autogenous pressure and at the indicated temperature, must move an observable distince (e.g., at least 1 millimeter) under the influence of gravity within a reasonable length of time, e.g., within 30 minutes. The boundary Line AC is conveniently determined experimentally by sealing into a set of glass tubes various ratios of polymer/solvent, i.e. a series of polymer concentrations, and observed the flow characteristics as a function of temperature. (Although FIG. 2 indicates the Boundary AC as a sharp line, the onset of "flowability" experimentally tends to occur over a range of a few degrees C.) Note that the criterion is a flowable solution, so that flow of two-phase systems (polymer/solvent or solution/solvent) is to be disregarded.

4. The upper limit on the operable area, Boundary DB, is a practical limit set by degradation sensitivity of the polymer. Normally, extrusion temperatures appreciably above 200° C. are to be avoided with PVC, even when provision for rapid heating and extrusion (and thus minimal exposure to high temperature) is made. With PS, temperatures as high as about 275° C. may represent this upper limit.

It has been verified experimentally that the products of this invention can be prepared only within area DCAB. For example, if one selects a given extrusion temperature, such as that represented by Line L on FIG. 2, and extrudes progressively more and more dilute solutions, one will observe the following: first, at 0 percent solvent, the product will be solid (unfoamed). When a little solvent is added, cellular products are obtained, but these will be thick walled, non-polyhedral-shaped celled foams until an appreciable proportion of solvent is reached. As Boundary AB is approached, the product density does decrease but the product is observed to have open cells. Most surprisingly when even larger proportions of solvent are added and Boundary AB is exceeded the product is observed to be closed celled, until Boundary CD is exceeded whereupon an open-celled product again results.

This open-closed-open-cell phenomenon is quite unexpected and contrary to prior experience and teachings in the thermoplastic polymer foam art. However, once discovered, it is possible to rationalize this behavior by the following hypothesis:

1. below the boundary AB there is insufficient heat absorbed on flash evaporation of all the solvent present to bring the temperature of the foam below $T_M$, which is the effective glass transition temperature ($T_g$) for the system. Since the polymer crystallizes to an insufficient extent to stabilize the hot cell walls of the foam produced by the expanding vapor, the shear-generated molecular orientation of the polymer in the cell walls relaxes and pulls polymer "out" of the walls, thus producing open cells.

2. between AB and CD the final temperature of the system will be between the boiling point of the solvent and $T_M$. Thus, all the solvent will have evaporated, but the cellular polymer structure will have been quenched below $T_M$ ($T_a$) and thus will remain stable in closed-cell configuration.

3. above CD so much solvent is present initially that adiabatic vaporization will quench the system to the boiling point of the solvent without having required all the solvent to evaporate. Thus a wet liquid-solvent-containing foam product will result and this residual liquid solvent will plasticize the cell walls to again permit molecular relaxation, with resultant production of open cells.

Although we do not wish to be bound by the above hypothesis, the following experimental observations lend strong support to its probable validity:

1. the closed-cell PVC or PS products prepared by this invention are stable indefinitely at low to moderate temperatures. However, on testing portions of a sample at progressively higher temperatures, a precipitous drop in closed-cell content (as well as a dimensional shrinkage) is observed for a given formulation (i.e., specific polymer molecular weight, tacticity, crystallinity, stabilizer content, etc.) at test exposure temperatures greater than $T_M$. This in fact is the preferred experimental method for estimating the exact value of $T_M$, and this behavior is illustrated in FIG. 3 for a given formulation.

2. The closed cell character of the foam products of this invention is almost completely destroyed by even brief (e.g., a few seconds) exposure to a solvent bath (e.g., PVC foam in methylene chloride) at its boiling point.

The requirement for a flowable solution, which results in Boundary AC, appears to be related to the necessity for the solution to flow smoothly through the extrusion equipment as well as for the solution to flow and "follow" the vapor generation/bubble expansion on foam formation in order to form a closed-cell foam especially one having the extremely thin walls and molecular super-packing (as explained under Product Description below). (For experimental reasons mentioned earlier, as well as the fact that "flowability" during extrusion and foam formation must occur at higher shear rates than those existing in the simple flow test described, Boundary AC must be considered as somewhat approximate.) It has been observed experimentally that 1. closed-cell thin-walled products are not produced with acceptable uniformity on extruding "solutions" appreciably below the AC boundary, and
2. those "solvents" which do not lead to "flowable" solutions anywhere in the region between boundaries AB and CD have not been successfully employed for extrusion of acceptable closed-cell thin-walled products.

It is common for the products of this invention to collapse to a relatively dense, (e.g. 0.1 g./cc.) form shortly after extrusion. The extrusion process restrictions require that the quantity of solvent be chosen such that within a very brief time, e.g. less than 1 second after extrusion, flash vaporization of the solvent produces a closed-cell product containing solvent vapor at a temperature above the solvent boiling point and below $T_M$. Diffusion of this vapor out of the closed-cell product will necessarily be a relatively rapid process in view of the high solubility of the vapor in the polymeric cell walls. Accordingly, outward diffusion of solvent vapor occurs much faster than external air diffuses into the cells, resulting in a decrease in internal gas pressure. Since the polymeric cell walls are too thin to support the external atmospheric pressure when the internal gas pressure decreases appreciably, the foam collapses partially. However, since the cell walls are flexible and still unruptured, these partially collapsed foams may be fully reinflated, as required, by a process such as disclosed in the examples below or in U.S. Pat. No. 3,344,221, issued Sept. 26, 1967.

The partially collapsed foam initially produced has desirable attributes of its own: it is stable indefinitely, until exposed to a suitable reinflation treatment. Thus, it can be more economically stored and shipped, and subsequently reinflated as desired. It may also be reinflated "in place", e.g., as a batt of foam fibers within a confining (shaping) form, or in continuous filament form it may be woven and reinflated in fabric form.

Addition of quantities of a suitable impermeant inflatant gas to the extrusion mixture can minimize or eliminate the initial foam collapse, if desired.

Product Description

The terms employed in defining the foam products of this invention may be more fully understood from the following discussion:

"PVC" denotes polyvinyl chloride, an addition polymer of vinyl chloride monomer units of sufficiently high degree of polymerization to be of film-forming molecular weight. Similarly, "PS" denotes the usually commercially available, amorphous, atactic, type of polystyrene which is made by the polymerization of sufficient styrene monomer units to provide a polymer of film-forming molecular weight. When desired, the polymer may contain minor amounts (e.g. less than 10 percent) of additives to provide improved thermal stability, lubricants to assist in compounding and extruding the resin, pigments, etc. Such polymer additives are well known in the art and do not constitute a part of the present invention.

A "polyhedral-celled foam" is one whose individual cells started as tiny spherical bubbles which expanded in size until they "ran into" neighboring cells, thus producing adjacent cells separated by a film-like polymeric membrane. Any given cell is defined by a plurality of such film-like walls, each wall bordered by a plurality of adjacent walls, e.g., five or six walls. A familiar example of polyhedral celled foam is a froth of soap bubbles.

"Closed cell" is employed here to denote a foam at least 80 percent by volume of which consists of individual cavities which are completely enclosed by polymeric gas-confining walls. The closed-cell content of any given sample may be determined by the gas-displacement technique of Remington & Pariser, "Rubber World", May 1958, Page 261, modified by operating at as low gas pressure differentials as possible to minimize distortion of the resilient foam samples. This test is to be performed on fully gas-inflated samples, as described hereinafter.

It is obvious that samples whose load supporting ability is due almost entirely to confined gas in its cells can operate usefully only when a large fraction of the cells are closed gas-confining structures. For the present invention a lower limit of 80 percent closed-cells has arbitrarily been selected, but it is obvious that higher percentages of closed-cells are desirable, and foams with greater than 95 percent closed-cells are preferred.

"Thickness" of individual cell walls is determined with an interference microscope using standard procedures, such as described in "Interference Microscopy", Krug, Rienitz & Schulz, translated by J. H. Dickson, published by Hilger & Watts, Ltd., 1964. The required specimens are obtained by dissecting a cellular sample into thin portions containing regions spanned by only single cell walls. In the preferred PVC forms of this invention, the thickness, as determined on at least five walls selected at random, must average less than one-fourth micron. In addition to the desired flexibility which such thin walls possess, it has been discovered that only those flash-extruded PVC foams having such thin walls can become quenched fast enough to stabilize the super-packed molecular structure, defined below. Apparently, only such thin walls will allow all solvent molecules to be near enough to an interface so that diffusion and evaporation can be sufficiently rapid. Furthermore, such thin walls provide good light scattering and hence attractive, white, opaque foams, as well as very low density structures.

The "uniformity of thickness" of the cell walls of the preferred PVC foams of this invention is such that the thickness of any given wall will not vary by more than ±50 percent over its whole area, again as determined by the interference microscope. Cell walls of a foam which has not been fully blown (or which has been allowed to relax from a fully blown stage) will exhibit thickened regions near the intersection of adjacent walls. In extreme cases (e.g. where the bubbles forming the cells have stopped growing when they first become tangent) the cross-section of a cell wall will resemble an hour glass, i.e., the center of the wall is its thinnest part. (PVC foams prepared by the plastisol and high pressure molding methods tend to have walls with edges thicker than their centers.) Uniform wall thickness is desirable because it makes more efficient use of the available polymer in confining gas in the cells since the gas will escape preferentially by the shortest diffusion path through the surrounding polymer, i.e., through any thin spots.

"Super-packing of polymer molecules" for the purpose of this invention is defined to exist when the index of refraction of the cell walls is equal to or exceeds that of the bulk unoriented polymer from which the foam was made. This molecular super-packing contributes to the superior gas-retaining ability of the present PVC foam structures.

The index of refraction of the cell walls is determined at normal incidence, again employing the interference microscope. The classical technique which calculates the index of refraction from measurements of the optical retardation of the cell wall immersed in two fluids of known refractive index is used. Since the present cell walls are very thin, the sensitivity and accuracy of the determination are increased by specifying that these two fluids are to be air and a standard immersion liquid of very high refractive index, say, 1.80, e.g. series M oil available from R. P. Cargille Labs., Inc., Cedar Groves, N.J., and employing monochromatic illumination of 0.546 micron wavelength (Hg green line).

Determination of the bulk polymer index of refraction is made either by immersing granules of the unoriented polymer in a series of standard liquids of graduated refractive index until a "match" is found, or by dissolving a portion of the foam itself in cyclohexanone, casting a thin film (e.g., one-fourth micron thick), drying the film for 1 hour at 90° C., and determining the index of refraction of the unoriented polymer in the film by the same technique described above for cell wall measurements. For example, PVC and PS polymers normally have an index of refraction in the range 1.53 to 1.55, and 1.59 to 1.60, respectively, depending on molecular weight, molecular weight distribution, degree and frequency of branching, etc. The PVC polymer used in the Examples below has a refractive index of 1.54.

Prior art processes for converting bulk PVC to a foamed product produce a "porous" cell wall containing submicroscopic voids or fissures. Such voids "dilute" the polymer of the cell walls and inevitably produce a decrease in the apparent index of refraction to a value below that of the parent bulk polymer. (Such voids are of course undesirable in that they offer "escape routes" for gas entrapped in apparently "closed cell" products.) In contrast, the cell walls of the PVC foam products made by the process of the present invention are comprised of super-packed molecules and exhibit indices of refraction at least as high as that of the parent bulk polymer. In fact, indices of refraction even higher than that of the bulk polymer are frequently observed for the present products. This surprising phenomenon might come about through two possible mechanisms:

1. Generation of planar molecular orientation during cell wall formation could theoretically increase the index of refraction by up to about 0.02 units as compared with the parent polymer, depending on the degree of perfection of planar molecular orientation achieved. Some planar molecular orientation is undoubtedly produced by the process of the present invention, and this type of orientation will also assist in the gas-retaining capacity of the products.

2. There is some evidence that the present PVC foam products may have cell walls whose molecules are super-packed not only with respect to the prior art foam products, but also with respect to the bulk polymer itself. This surprising and unique feature will again lead to enhance gas retention ability, as well as to index of refraction values higher than that of the bulk polymer.

The following examples will serve to illustrate the process and products of the present invention, and to contrast them with certain prior art.

Polyvinyl chloride of specific viscosity 0.32 (Diamond Alkali "Dacovin" 3010 — compounded containing a stabilizer) is gravity-fed from a hopper at a measured rate to a 2 inch (5.08 cm.) John Royal 1A ex-

EXAMPLE I truder. The 2 inch (5.08 cm.) diameter screw has 0.270 inch (0.686 cm.) deep feed and 0.090 inch (0.229 cm.) deep metering sections and a 20/1 L/D ratio, and is driven by a 15 hp U.S. "Varidrive" through a No. 50 Dodge "Torque-Tamer". The polymer is advanced, melted, metered, and delivered at a temperature of 205° C. through a transfer line to a second 2 inch (5.08 cm.) Royal extruder where solvent is added and mixed. The solvent is a mixture of methylene chloride/fluortrichloromethane (9/1 by volume) containing one-half weight per cent silica aerogel (Monsanto's "Santocel 54") and one-half weight per cent n-butanol, and is metered at a rate to produce a 61 weight per cent polymer solution at a temperature of 171° C. This solution is delivered through a 100-mesh filter screen to a 20 × 40 mil (0.051 × 0.102 cm.) D × L cylindrical orifice at a pressure of 1,500 psig (105 Kg./cm.$^2$). The solvent flash-vaporizes as the solution passes through the orifice into a region of atmospheric pressure at room temperature, generating a polyhedral celled foam filament, which gradually collapses within a few seconds after formation to a density of 0.077 g./cm.$^3$ as the methylene chloride vapor diffuses out of the cells. This foam is subsequently fully reinflated to a density of 0.010 g./cm.$^3$ by immersing it in refluxing fluorodichloromethane/perfluoro-cyclobutane 3/1 (by volume) bath for 60 minutes followed immediately by air drying for 10 minutes at 70° C. The cell walls are 0.14 micron thick with less than 50 percent thickness variation across a cell wall, and have an index of refraction of 1.56. This inflated sample has approximately 95 volume percent closed cells.

As stated previously, the PVC foam structures of this invention are unstable at elevated temperature, i.e. temperatures above $T_M$. For example, portions of the above inflated PVC filament are exposed to a temperature of 120° C. for 10 minutes, whereupon the index of refraction of the cell walls falls to 1.53 and the closed-cell content decreases to 51 percent.

In another series of experiments portions of a similar PVC foam filament of this invention are exposed to various elevated test temperatures, and the percent closed cell content redetermined. The data are shown in FIG. 3, which indicates that $T_M$ for this sample is approximately 100° C., and when this temperature is exceeded, the closed cell character of the foam is destroyed. Furthermore, measurement of the diameters of this series of heated PVC foam filaments shows that shrinkage occurs for samples exposed above 100° C., with shrinkages up to 50 percent observed for test exposures up to 160° C.

Under suitable conditions particles of the PVC foam of this invention may be molded into coherent foam blocks. For example, quantities of the PVC foam filament prepared above are reinflated by immersing the filaments in a perfluorocyclobutane/fluorotrichloromethane/methylene chloride 63/22.5/14.5 (by volume) refluxing bath for 1 hour, hot-air dried and cut into one-fourth inch (0.64 cm.) "staple" and packed into a mold. The mold and contents are preferably heated to a temperature between 90° and 100° C. for a period of several minutes whereupon self-bonding of the individual foam particles produce a monolithic, shaped PVC foam block (although the original particles are still identifiable). The molded product still retains the unique and desirable PVC foam structure of this invention.

A set of experiments to illustrate the criticality of molding temperature is performed as follows. The one-half inch (1.27 cm.) thick aluminum rectangular mold cavities of 8 inches × 8 inches (20 × 20 cm.) area and various thicknesses are filled with the PVC foam "staple", as above, to various packing densities. The mold is closed and placed for 15 minutes in a press preheated to the desired temperature. Although the good thermal conductivity of the aluminum brings the mold rapidly up to temperature the foam staple charge reaches the designated temperature for only a couple of minutes or so, in view of its thermal insulating properties.

The data of Table I below indicates the preferred range of molding temperature to be limited to about 90°–100° C. At temperatures below 80° C. no surface fusion or adhesion of the foam staple occurs (as is reasonable for temperatures below the polymer Tg), and thus no coherent molded object is produced. At temperatures appreciably greater than 100° C., degradation of the foam structure occurs as indicated by the drop in refractive index and even shrinkage of the product, i.e., no "molding" is possible since the product does not even fill the mold. These detrimental effects of higher molding temperatures are consistent with the data of FIG. 3.

In other experiments it has been discovered to be possible to mold-in reinforcing elements, i.e., expanded metal plates, etc., by positioning them inside the mold with the foam staple. It is also possible to prepare surfaced products by lining the mold with films, foils, sheets, etc., (coated with suitable adhesives, if required), which become adhered to the PVC foam "core" during the molding operation.

Such molded PVC foam products have innumerable applications ranging from flotation devices to shaped thermal insulation to decorative objects. They are particularly valuable as shock-absorbing protective packaging devices since they are readily molded to fit diverse shapes, and since the unique PVC foam structure provides outstandingly good shock absorption.

TABLE I

| Press temp. (° C.) | Product | | Mold thickness, in. (cm.) | Foam packing density, lb./ft.$^3$ (g./cc.) |
|---|---|---|---|---|
| | Description | Index of refraction | | |
| | Foam "staple" | 1.56 | | |
| 80 | No adhesion | | ¼ (0.6) | 4 (0.06) |
| <80 | Some adhesion | | ¼ (0.6) | 4 (0.06) |
| 90 | Good adhesion and mold replication | | ¼ (0.6) | 4 (0.06) |
| 100 | do | 1.56 | 1 (2.5) | 1½ (0.02) |
| 110 | do | 1.53 | ½ (1.2) | 1½ (0.02) |
| 120 | Shrunken, porous | 1.52 | 1 (2.5) | 1½ (0.02) |
| 130 | do | | 1 (2.5) | 1½ (0.02) |

EXAMPLE II

The tandem extruders of Example I are employed to prepare a series of foams using the PVC polymer of Example I at various concentrations and temperatures in various solvent systems as indicated in Table IIA. In each run the solvent contains one-half percent aerogel particles and one-half percent n-butanol as in Example I. Runs 1 through 5 illustrate preparation of PVC foams from methylene chloride as the sole solvent, and pairs of Runs 6/7 and 8/9 illustrate use of mixed solvents.

Points representing the extrusion conditions for Runs 1 through 5 are plotted on FIG. 2 (methylene chloride solvent spinning diagram). Points for Runs 1, 2 and 5 fall within area DCAB and thus exemplify the process of this invention, while Runs 3 and 4 are not representative of the process of the invention. Inspection of the properties of the polyhedral celled PVC products produced in these runs, listed in Table IIB, confirms that the products of Runs 1, 2 and 5 do in fact meet all the requirements of the foams of this invention, while those of Runs 3 and 4 do not, e.g., they do not exhibit molecular super-packing since the refractive index is only 1.48.

Similarly, Runs 6 and 8 correspond to extrusion conditions within the areas DCAB for their respective mixed solvent systems, while Runs 7 and 9 illustrate flash extrusion "outside" the process limitations of this invention for these choices of mixed solvents. The data of Table IIB substantiate that the corresponding products do (Runs 6 and 8) and do not (Runs 7 and 9) meet the product requirements of this invention.

All products were fully reinflated by the following "standard" method prior to determining the properties reported in Table IIB. The as-spun (collapsed) samples are immersed for at least one-half hour in a refluxing 3–1 volume mixture of fluorodichloromethane/perfluorocyclobutane. The samples are immediately transferred to a 70° C. air oven for 10 minutes to drive off the plasticizer (fluorodichloromethane) thus trapping the perfluorocyclobutane in the closed cells, and to hasten air permeation into the cells to reach full reinflation. The samples are stored at least 24 hours in air at room temperature before subsequent measurements are made in order to allow any small quantities of residual fluorotri-chloromethane to escape.

To show the superior cushioning and load support properties of the products of this invention, the reinflated products of Runs 1 through 9 are exposed for 24 hours to a dead load of 75 psi (5.3 Kg./cm.$^2$). Samples 1, 2, 5, 6 and 8 (products of this invention) are compressed to 20–25 percent of the initial height, and subsequently begin a sustained re-covery process when the load is removed, since sufficient perfluorocyclobutane is retained in their cells to provoke continuing osmotic air-reinflation. In contrast, under the same test conditions, Samples 3, 4, 7 and 9, representing PVC foams outside the present invention, are compressed to 9–13 percent of their initial height, and show no recovery tendency whatsoever over a period of observation of at least 80 hours after removal of load.

EXAMPLE III

This example illustrates a PVC/methylene chloride extrusion under conditions outside the process limitations of this invention, e.g., "above" boundary CD in FIG. 2. Nine parts of the PVC polymer of Example I are mixed with 11 parts of methylene chloride (containing 1/2 weight per cent silica aerogel), confined in a pressure vessel and heated to 135° C. under pressure of 300 psig (20.7 Kg./cm.$^2$) for 5 minutes to form a 45 weight per cent solution. The pressure is increased to 1,000 psig (70.3 Kg./cm.$^2$) and after 2 minutes the solution is extruded through a 20 × 40 mil (0.051 × 0.102 cm.) D × L cylindrical orifice. These extrusion conditions are represented by Point IV on FIG. 2. The product is a "sintered" PVC ribbon which could not be reinflated, i.e., did not consist of thin-walled closed cells.

EXAMPLE IV

A low density PVC foam product of this invention is prepared by the procedure of Example I using PVC of specific viscosity 0.32 ("Dacovin" 3031, Diamond Alkali Co.), a polymer concentration of 61 weight percent, and extrusion temperature of 160.4° C. and pressure of 1,000 psig (70.3 Kg./cm.$^2$), and indicated by point V on FIG. 2. All other ingredients and conditions are as in Example I. The partially collapsed PVC foam filament produced is reinflated by immersing it for 30 minutes in a refluxing fluorodichloromethane/perfluorocyclobutane 3/1 (by volume) bath and transferring the filament directly to a 70° C. water bath, followed by air drying. The inflated foam filament density is only 0.007 g./cc. and the per cent closed cells is 96 volume percent. The index of refraction of the cell walls is 1.56.

EXAMPLE V

A mixture of 250 ml. of methylene chloride plus 10 ml. of stabilizer (Thermolite 31, M & T Chemicals) and 44 g. of fluorotrichloromethane is blended with 200 grams of PVC of inherent viscosity 1.13 in tetrahydrofuran (Dow No. 100–4, molding resin, previously dried at 40° C. under vacuum) as the ingredients are charged incrementally into a 1 liter pressure vessel. The mixing and blending (including stirring with a spatula) is conducted inside a dry box. The pressure vessel is closed and heated to 185° C. This solution is extruded through an 18 × 28 mil (0.046 × 0.071 cm.) D × L cylindrical orifice preceded by a 50 mesh filter screen under a total gas pressure of 700 psig (49.2 Kg./cm.$^2$), supplied from an external nitrogen ballast source. A white PVC foam fiber is produced as flash evaporation occurs when the super-heated polymer solution exits into the atmospheric pressure region through the orifice. Immersion of this strand in a mixture containing equal parts of dichlorofluoromethane and octafluorocyclobutane gives a turgid, round filament having a density of 0.011 g./cc. The bubbles range from 20 – 150 $\mu$ diameter and the inherent viscosity of the fiber is 1.00 in tetrahydrofuran. The average bubble size is 60 microns, the walls are 0.1 micron thick, have uniform thickness, and exhibit an index of refraction of 1.54.

TABLE IIA.—EXTRUSION CONDITIONS

| Run | Polymer, wt. percent | Solvent, wt. percent | | | Solution | | Spinneret DxL mils (microns) |
| --- | --- | --- | --- | --- | --- | --- | --- |
| | | MeCl₂ | MeCl₂/CFCl₃ 9:1, v./v. | MeCl₂/CF₂ClCF₂Cl 9:1, v./v. | T., °C. | P, p.s.i.g. (kg./cm.²) | |
| 1 | 59.9 | 40.1 | | | 170.0 | 1,000 (70.3) | 15 x 0 (375 x 750) |
| 2 | 52.3 | 47.7 | | | 159.7 | 1,000 (70.3) | 15 x 30 (375 x 750) |
| 3 | 61.0 | 39.0 | | | 177.7 | 1,600 (112.5) | 20 x 40 (500 x 1,000) |
| 4 | 61.8 | 38.2 | | | 193.5 | 1,000 (70.3) | 20 x 40 (500 x 1,000) |
| 5 | 57.0 | 43.0 | | | 175.2 | 1,250 (87.9) | 15 x 15 (375 x 375) |
| 6 | 51.9 | | 48.1 | | 170.2 | 1,200 (84.5) | 15 x 30 (375 x 750) |
| 7 | 60.3 | | 39.7 | | 191.2 | 1,200 (84.5) | 15 x 30 (375 x 750) |
| 8 | 51.6 | | | 48.4 | 160.8 | 1,000 (70.3) | 20 x 40 (500 x 1,000) |
| 9 | 61.9 | | | 38.1 | 179.5 | 1,000 (70.3) | 25 x 50 (625 x 1.250) |

EXAMPLE VI

The manufacture of polystyrene foams according to the process of this invention is illustrated in this example.

Dry polystyrene resin ("Styron" by Dow Chemical Company) of 0.82 inherent viscosity in benzene is mixed with Freon 21 (fluorodichloromethane) in a one-to-one weight ratio. A total of 800 grams of this mixture is charged into a 1-liter pressure vessel which is supplied, as in Example V, with means for pressurizing the vessel and with means for extruding material from the vessel. The vessel is closed, heated to 150° C., and held at this temperature for at least one hour, while the contents are mixed by turning the vessel slowly end over end. The pressure is raised to 1,700 psi by the addition of nitrogen. The solution formed within the vessel is then extruded through a cylindrical orifice measuring 0.012 inch in diameter by 0.012 inch in length. A smooth, uniform filament of polystyrene foam forms as flash evaporation occurs when the superheated solution enters the region of atmospheric pressure downstream of the orifice. The low density polystyrene foam produced by this example resembles the inflated polyvinylchloride foams of this invention in cell dimensions, shape, visual and tactile appearance. The density of the as-spun PS fiber is about 0.014 gm./cc. and its inherent viscosity in benzene is 0.69. The polystyrene foam is surprisingly flexible.

EXAMPLE VII

A mixture of 280 ml. of 70 parts by volume of Freon 113 (trifluorotrichloroethane) with 30 parts of methylene chloride is blended under dry conditions with 400 grams of polystyrene resin ("Styron" by Dow Chemical Company). The blend is charged into a 1-liter pressure vessel and brought to 210° C. as in the preceding example. The contents are held at temperature for 1 hour. The pressure is adjusted to 650 psi. The resultant solution is then extruded through a cylindrical orifice measuring 0.012 inch in diameter by 0.012 inch in length into the atmosphere. This flash extrusion produces a flexible, closed-cell polystyrene foam filament as in Example VI.

EXAMPLE VIII

To illustrate prior art processes, a PVC polymer of k-value of 70 containing 2 percent lead stearate is gravity-fed from a hopper at a measured rate of 1.75-inch (4.44 cm.) 30/1 L/D extruder manufactured by the Sterling Extruder Corporation. The 1.75-inch (4.44 cm.) diameter screw is divided into four sections: (1) a 0.217-inch (0.551 cm.) deep feed section with L/D = 6.6, (2) a compression section with L/D = 4.4, (3) a 0.072-inch (0.183 cm.) deep metering section with L/D = 6.6, and (4) a flighted torpedo mixing section with L/D = 12.4. The screw is driven by a 10 hp electric motor through a U.S. Electrical Motors, Inc., "Vari-Drive" and a 1,200 ft.-lb. Dodge "Torque-Tamer". The polymer is advanced, melted, and metered into the mixing section where methylene chloride is metered and mixed to form a 70 weight percent polymer solution at 163.5° C. which is extruded through a 40 × 40 mil (0.012 × 0.012 cm.) cylindrical orifice. The conditions correspond to Point III on FIG. 2 and hence do not meet the process requirements of this invention. The product, after the standard reinflation treatment, is observed to have cell walls with an index of refraction of 1.50, thickness of 0.5 micron, thickness variation of 100–200 percent and only 22 volume percent closed cells, thus failing on each count to meet the requirements of the present PVC foam products.

A similar experiment substituting acetone for methylene chloride and extruding at a temperature of 160.4° C., produces a product having cell walls of index of refraction of 1.46, thickness of 0.4 micron, thickness variation of 200 percent and 88 volume percent closed cells, again failing to exhibit molecular super-packing. In spite of its thicker cell walls and substantial volume per cent of closed cells, this sample, after the standard reinflation treatment, collapses to 15 percent of its initial thickness in the compression test and exhibits a rate of recovery less than one-half that of the foams of the present invention represented by the products of Runs 1, 2, 5, 6 and 8 of Example II.

Another extrusion representative of a prior art process extrudes 77.5 percent PVC pellets/22.5 percent vinyl chloride mixture at 120° C. through a 75 × 75 mil (0.191 × 0.191 cm.) cylindrical orifice. The pellets are compounded from 100parts PVC (Vygen 85, General Tire and Rubber Co.), 2 parts epoxidized soybean oil (Flexol EPO, Union Carbide Co.), 1 part tin-organic stabilizer (Thermolite 31,M & T Chemicals), 1 part aluminum hydroxide powder (Baker and Adamson, reagent grade) blended on a rubber mill at 165° C., cooled and chopped into one-eighth inch (0.3 cm.) pellets. (This system does not pass the "flow test" for the process of this invention.) The resulting foam is a predominately open-celled product with thick walls and a refractive index of only 1.50.

TABLE IIB.—PROPERTIES OF PVC FOAM

| Run | Refractive index | Wall thickness variation, percent | Wall thickness, microns | Density, g./cc. | Volume percent closed cells |
|---|---|---|---|---|---|
| 1 | 1.56 | | 0.15 | 0.014 | 94 |
| 2 | 1.55 | | 0.20 | 0.017 | 100 |
| 3 | 1.48 | | 0.18 | 0.011 | 75 |
| 4 | 1.48 | | 0.18 | 0.020 | 10 |
| 5 | 1.56 | 20 | 0.14 | 0.011 | 92 |
| 6 | 1.56 | 20 | 0.18 | 0.014 | 92 |
| 7 | 1.52 | 40 | 0.2 | 0.016 | 1 |
| 8 | 1.56 | | 0.13 | 0.013 | 91 |
| 9 | 1.50 | | 0.13 | 0.014 | 5 |

I claim:

1. A flash extrusion process for forming a polyvinyl chloride foam which comprises:
   A. forming a solution of the polyvinyl chloride in a methylene chloride solvent having a boiling point below about 100° C.
   1. at a temperature above the boiling point of the solvent and below about 200° C. and at a pressure at least equal to autogenous pressure,
   2. at a concentration such that
      a. under autogenous pressures the solution is single phase and is flowable, and
      b. the heat absorbed upon adiabatic vaporization of all the solvent present will reduce the temperature of the product to a value between the stability temperature of the foam and the boiling point of the solvent; and
   B. extruding said solution abruptly through an orifice into a region at lower pressure whereupon flash vaporization of substantially all the superheated solvent occurs to produce a closed cell foam retaining substantially no residual solvent.

2. The process of claim 1 wherein the polymer foam is extruded in the form of a filament.

* * * * *